US008505684B1

(12) United States Patent
Bogue

(10) Patent No.: US 8,505,684 B1
(45) Date of Patent: Aug. 13, 2013

(54) AERIAL WORK PLATFORM APPARATUS AND METHOD

(76) Inventor: Marc Bogue, Beresford, SD (US)

( * ) Notice: Subject to any disclaimer, the term of this patent is extended or adjusted under 35 U.S.C. 154(b) by 604 days.

(21) Appl. No.: 12/366,392

(22) Filed: Feb. 5, 2009

(51) Int. Cl.
*C05B 11/00* (2006.01)

(52) U.S. Cl.
USPC .......................... 182/19; 182/69.5; 208/6.153

(58) Field of Classification Search
USPC ................................ 182/19, 69.5; 280/6.153
See application file for complete search history.

(56) References Cited

U.S. PATENT DOCUMENTS

| | | | | |
|---|---|---|---|---|
| 3,902,616 | A | | 9/1975 | Santic |
| 4,067,245 | A | | 1/1978 | Santic |
| 4,092,011 | A | | 5/1978 | Luebke |
| 4,142,710 | A | * | 3/1979 | Okuda .......................... 254/423 |
| 4,381,101 | A | | 4/1983 | Herrin |
| 4,392,687 | A | | 7/1983 | OConnell |
| 4,526,344 | A | | 7/1985 | Oswald |
| 4,679,489 | A | * | 7/1987 | Jasinski et al. .................... 91/36 |
| 4,684,314 | A | | 8/1987 | Luth |
| 4,746,262 | A | | 5/1988 | Anderson |
| 4,913,458 | A | * | 4/1990 | Hamilton ................... 280/6.153 |
| 4,930,598 | A | | 6/1990 | Murrill |
| 4,943,204 | A | | 7/1990 | Ehrlich |
| 5,145,029 | A | | 9/1992 | Blasdell |
| 5,159,989 | A | * | 11/1992 | Claxton .......................... 180/41 |
| 5,297,653 | A | | 3/1994 | Wurtz |
| 5,337,858 | A | * | 8/1994 | Neubauer et al. ............. 182/148 |
| 5,690,465 | A | | 11/1997 | Ledwell |
| 5,979,927 | A | | 11/1999 | Hale |
| 6,044,927 | A | | 4/2000 | Newlin |
| 6,050,573 | A | | 4/2000 | Kunz |
| 6,351,696 | B1 | * | 2/2002 | Krasny et al. ................... 701/50 |
| 7,000,927 | B2 | | 2/2006 | Bell |
| 7,025,178 | B2 | | 4/2006 | Wengelski |
| 7,193,381 | B2 | | 3/2007 | Ford |
| 7,208,896 | B2 | | 4/2007 | Ford |
| 7,294,797 | B2 | | 11/2007 | Erickson |
| 7,740,109 | B2 | | 6/2010 | Moller |
| 8,028,973 | B2 | | 10/2011 | Ford |
| 2004/0045768 | A1 | | 3/2004 | Puszkiewicz |
| 2009/0038186 | A1 | | 2/2009 | Osswald |

OTHER PUBLICATIONS

"Level Up Six Point RV Leveling System"; brochure; pp. 1-4; Lippert Components, Inc., Goshen, IN.

"EZ Flip 4-Point Leveling System w/Wireless Remote Control"; website, http://www.guadralevelercom/store/index.php?main_page=product_info&cPath=20&products_id=92; download date Jul. 18, 2012; Bigfoot Quadra Manufacturing Leveling Systems.

(Continued)

*Primary Examiner* — Blair M. Johnson

(74) *Attorney, Agent, or Firm* — Jeffrey A. Proehl; Woods, Fuller, Shultz & Smith, P.C.

(57) ABSTRACT

An aerial work platform apparatus and method for automatically leveling a mobile aerial work platform, including a base frame, a movable platform, a lift mechanism configured to move the platform in a substantially vertical direction with respect to the base frame, a stabilizing assembly including at least one outrigger leg mounted on the base frame, and a control assembly.

17 Claims, 9 Drawing Sheets

OTHER PUBLICATIONS

"IntelliJacks", website http://www.intellijacks.com/; download date Jul. 18, 2012; IntelliJacks—5th Wheel Intelligent Leveling.

"RV Leveling System Comparison"; website http://www.intellijacks.com/fifth-wheel-hitch/compare-rv-leveling-systems.htm; download date Jul. 18, 2012; IntelliJacks—5th Wheel Intelligent Leveling.

HWH Corporation; website http://www.hwhcorp.com/; download date Jul. 18, 2012.

"HWH Hydraulic & PowerPlus Hydraulic Levelers"; website http://www.pplmotorhomes.com/parts/hydraulic-levelers-rv-jacks-stabilizers-leveling.htm; download date Jul. 18, 2012; PPL's RV Parts Superstore, Houston, Texas.

Lippert Components Inc.; website http://www.lci1.com/index.php?option=com_content&view=article&id=128:leveling-towablespage&catid=34:products; download date Jul. 18, 2012.

* cited by examiner

AERIAL WORK PLATFORM APPARATUS AND METHOD

BACKGROUND OF THE INVENTION

1. Field of the Invention

The present invention relates to aerial work platforms, and more particularly pertains to a new aerial work platform apparatus and method that are safer and easier to use that foregoing lifts.

2. Description of the Prior Art

Aerial work platforms (AWPs) encompass a variety of different configurations, all designed for the purpose of providing temporary access to elevated areas. Numerous types of lifting mechanisms may be employed for raising and lowering AWPs, including articulated lifts, such as bucket trucks, boom lifts or "cherry pickers," scissor lifts, and mechanical lifts, such as those employing rack and pinion elements or screw thread elements. Scissor lifts, in contrast to boom lifts, are able to move in only in a vertical direction, because of the scissor mechanism. The scissor mechanism comprises a support with a plurality of pivotally linked, folding elements that criss-cross each other in a substantially X-shaped pattern. The folding support, when in a contracted position, appears as a stack of the plurality of substantially horizontal, elongated elements. A hydraulic cylinder is interposed between an adjacent set of elongated elements such that expansion of the hydraulic cylinder causes the elongated elements to pivot in relation to each other, unstacking the elements and extending the structure, and as a result raising the work platform. Lowering of the support is performed by contracting the hydraulic cylinder and as a result the support, so that the elongated elements return to their stacked position, also by pivoting in relation to each other.

Because AWPs are typically used for work of a temporary nature, conventional AWPs include a wheeled chassis having an electric or combustion motor for driving one or more of the wheels. Transporting the platforms over long distances generally requires trailering of the apparatus, as self-motivated AWPs are not suited for highway use. Conversely, AWPs mounted directly on a trailer chassis may be moved by attaching the trailer chassis to a vehicle. Long distance transportation of a trailer chassis mounted AWP is possible where the device has wheels intended to rotate at highway speeds. In order to increase maneuverability, trailer chassis mounted AWPs typically employ a single axle, though use of a multiple axles is possible. Regardless of whether a single axle or a multiple axle is employed, the nature of AWPs typically requires some kind of stabilization apparatus to prevent lateral movement from causing a partially- or fully-extended lift to overturn. In their fully extended position, the distance between the work platform and trailer chassis substantially exceeds the horizontal dimensions of the portion of the trailer chassis in contact with the ground. Because the ratio of the height of the unit to the width of its base is high, the lateral stability of the AWP is affected by even relatively small lateral movements of the work platform. This problem is magnified when the trailer is supported by relatively soft highway tires. To overcome the problem of lateral instability, it is known to use a support apparatus to secure or brace the device. The support apparatus may comprise either a securing mechanism, in which the lift is secured to a fixed object, or a bracing mechanism, in which fixed legs connect the chassis of the AWP to the ground in order to increase the effective footprint of the device. The increased footprint resulting from the use of a support apparatus decreases the AWP's lateral instability, increasing the amount of lateral force necessary to overturn the lift apparatus.

A number of existing methods for bracing an AWP to bolster lateral stability have been used. In one method of bracing an AWP, outriggers are provided which extend from the lift's frame. Mounted on an outer end of these outriggers is a manually operated, screw-type leveling jack. In use, an operator applies rotary motion to the handle of the screw-type leveling jack, causing a wheel and caster component of the jack to either raise or lower. The operator manually positions the wheel and caster component in a vertical direction so that the wheel engages the ground. By successively adjusting the leveling jacks on each of the four outriggers, an operator can cause the AWP to be completely supported by the outriggers. Furthermore, by continuing to adjust the leveling jacks on the outriggers, an operator levels the machine.

In another method of bracing an AWP, folding outriggers are employed. The outriggers consist of a channel member connected to the base of the AWP through a pivoting mechanism, which allows the outriggers to pivot in the horizontal plane of the base. In their folded position, the outriggers are positioned along the base of the AWP so that the width of the lift is minimized. In their unfolded position, the outriggers are positioned perpendicular to the side of the base on which they are connected, so that the outriggers maximize the width of the lift.

Because proper leveling, bracing and operation of an AWP is necessary to ensure the safety of both the operator and those around the AWP, it is believed that an improved aerial work platform apparatus and method of use is needed.

SUMMARY OF THE INVENTION

In view of the foregoing disadvantages inherent in the known types of aerial work platforms now present in the prior art, the present invention provides a new aerial work platform apparatus and method that are safer and easier to use that foregoing lifts.

While the devices known in the art offer various solutions to the broad issue of supporting and leveling an aerial work platform, no known device exists which allows a user to automatically level an aerial work platform, both encouraging operators to ensure that the lift is level before use and expediting the time needed to prepare the platform for use.

To attain this, an aerial work platform is disclosed that includes a base frame, a tongue extension of the base frame, an axle mounted on the base frame with a pair of wheels, one or more outrigger legs located about the perimeter of the frame, a lift mechanism, a movable platform, and a control assembly.

In another aspect of the disclosure, a method is disclosed for automatically leveling a mobile aerial work platform apparatus. The method includes providing a mobile aerial work platform apparatus that includes a mobile base, a movable platform, a lift mechanism configured to move the platform in a substantially vertical direction with respect to the mobile base, a stabilizing assembly including at least one outrigger leg mounted on the mobile base, and a control assembly. The method further comprises receiving by the control assembly a command from an operator to automatically level an orientation of the mobile base of the apparatus, and automatically adjusting the stabilizing assembly so that an orientation of the mobile base is substantially level, wherein the control assembly is configured to receive input from and sends output to the stabilizing assembly to perform the automatic adjustment.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

With reference now to the drawings, and in particular to FIGS. 1 through 10 thereof, a new aerial work platform apparatus and method embodying the principles and concepts of the present invention will be described.

Figure 1:
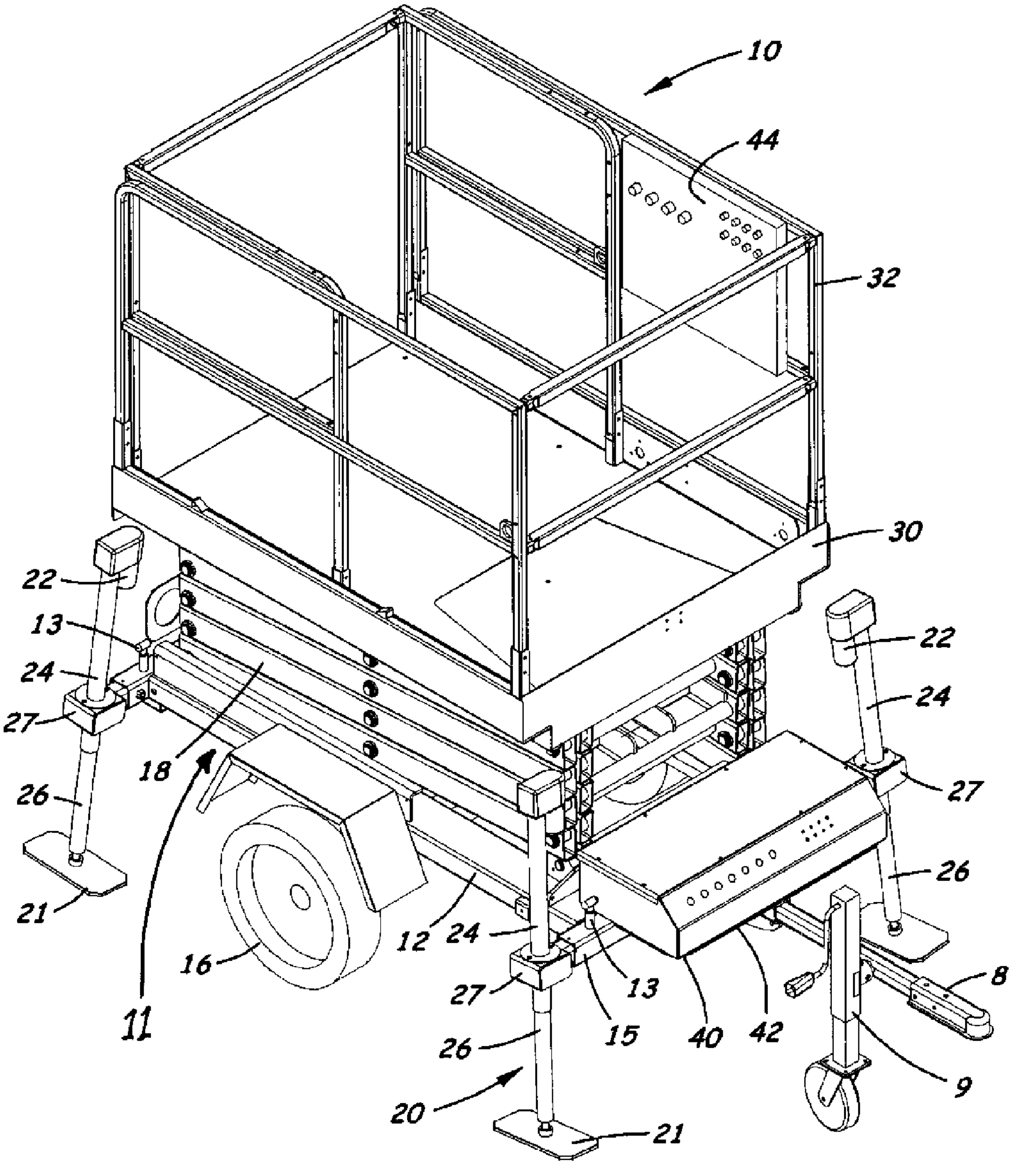
FIG. 1 is a schematic perspective view of the apparatus of the present disclosure, showing the aerial work platform apparatus in the travel position, with the outrigger legs retracted relatively closely to the base frame and the movable platform in its lowered position.
Figure 2:
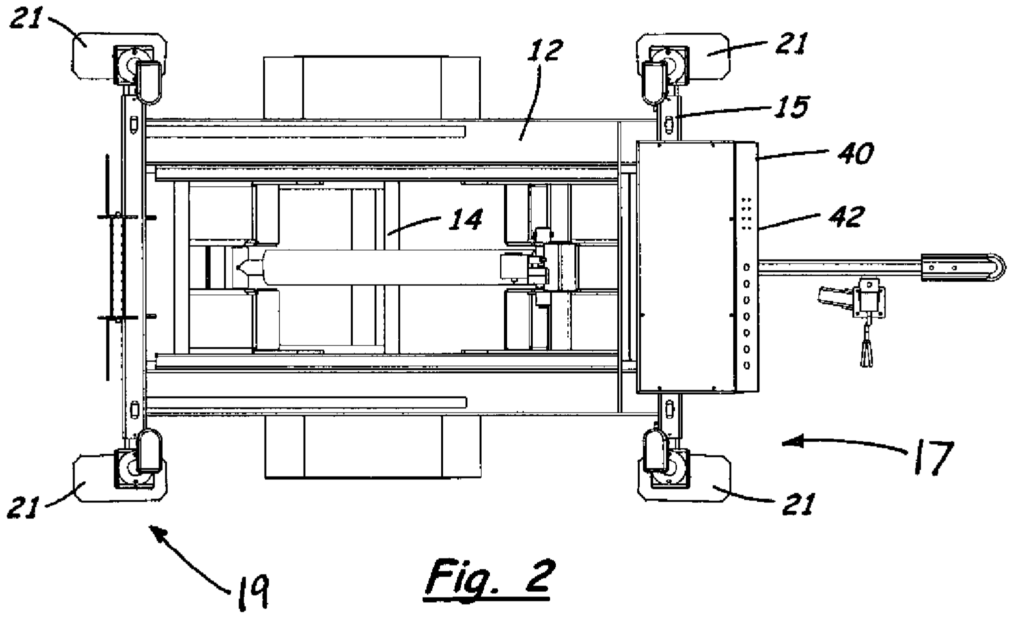
FIG. 2 is a schematic top view of the apparatus of the present disclosure, showing the outrigger legs retracted relatively closely to the base frame.
Figure 3:
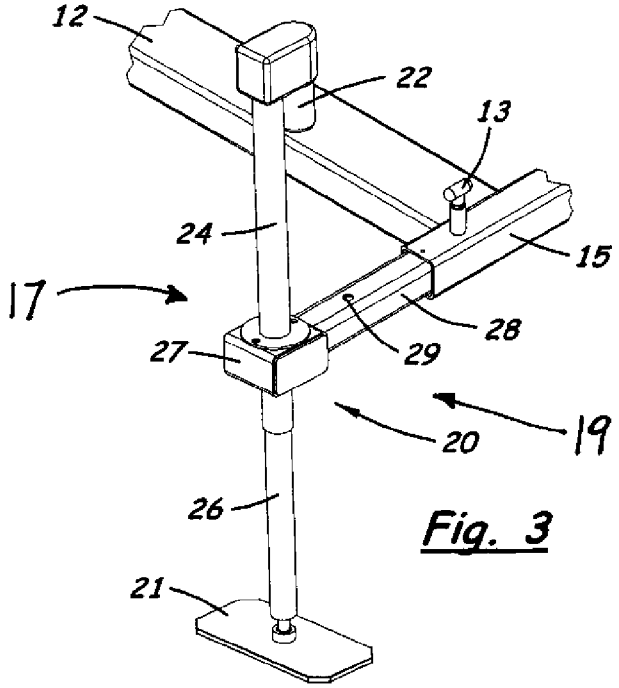
FIG. 3 is a schematic perspective view of an outrigger leg of the apparatus of the present disclosure shown in the in-use position of the leg, with the ground-contacting pad in contact with the ground beneath the apparatus.
Figure 4:
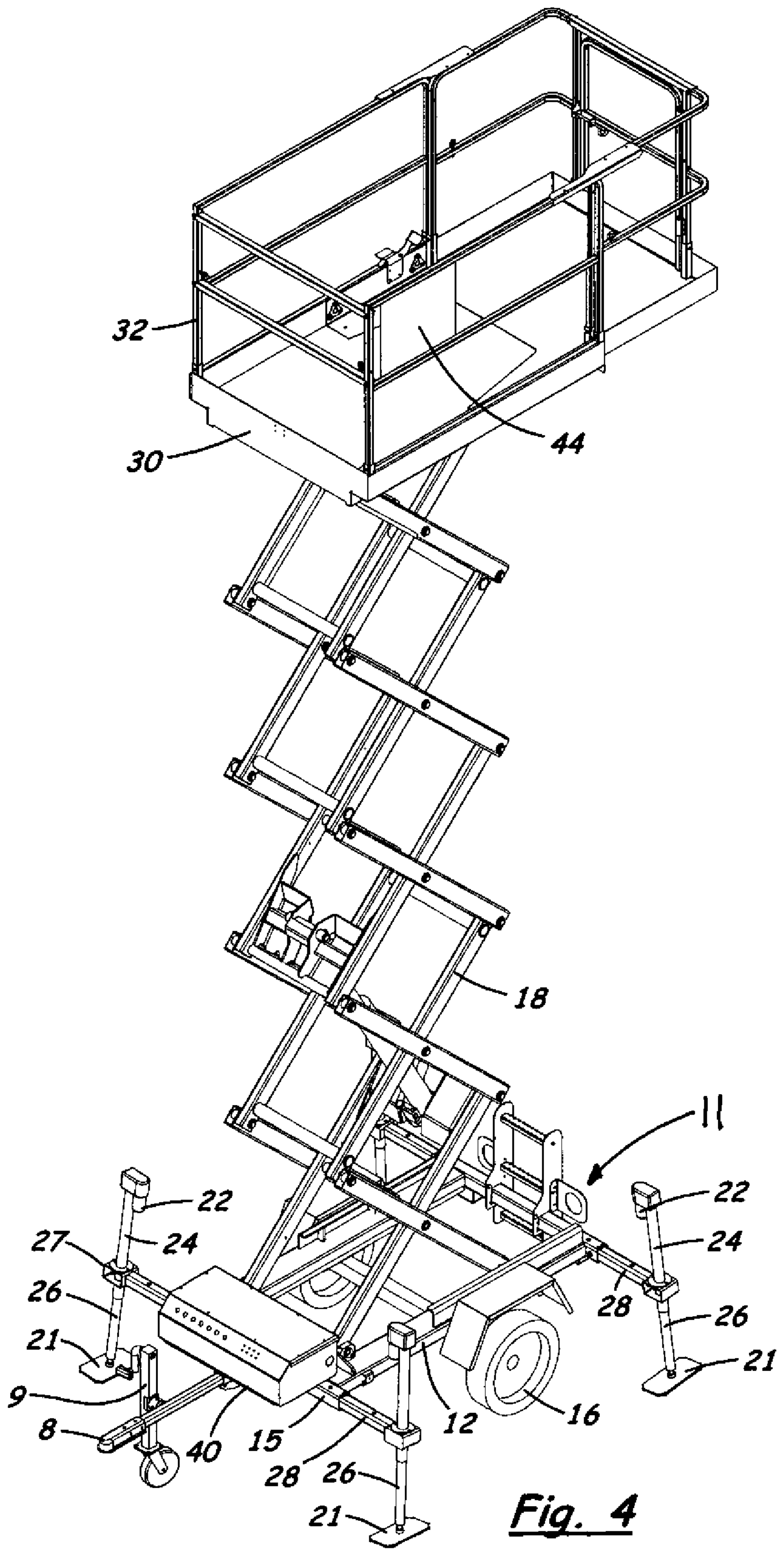
FIG. 4 is a schematic perspective view of the apparatus of the present disclosure, showing the aerial work platform apparatus in configured for use, with the movable platform in a raised position and the outrigger legs horizontally extended from the base frame and the ground-contacting pads in contact with the ground beneath the apparatus to support the apparatus in a level position.
Figure 5:
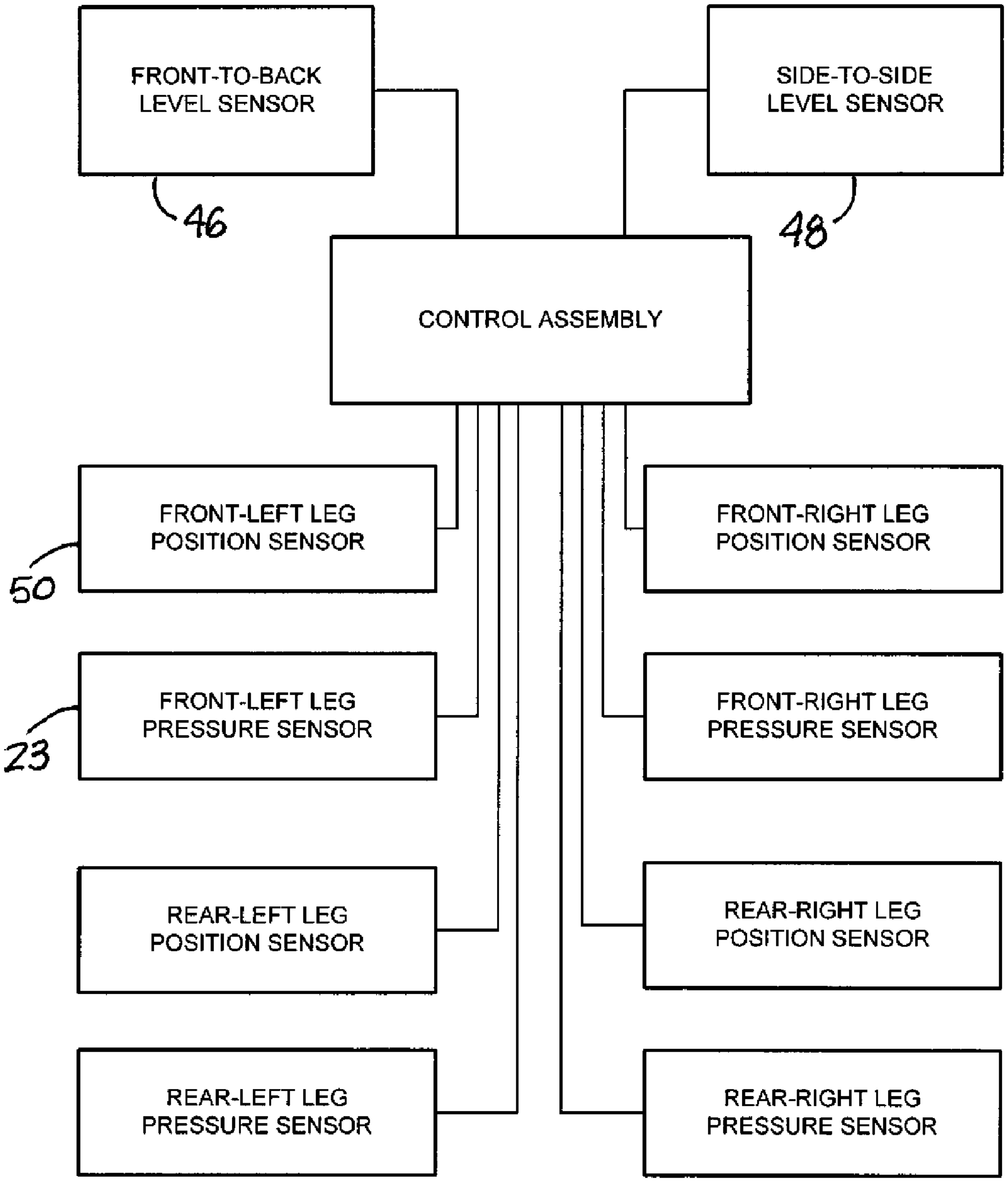
FIG. 5 is a schematic diagram of sensor and control elements of the apparatus of the present disclosure.
Figure 6:
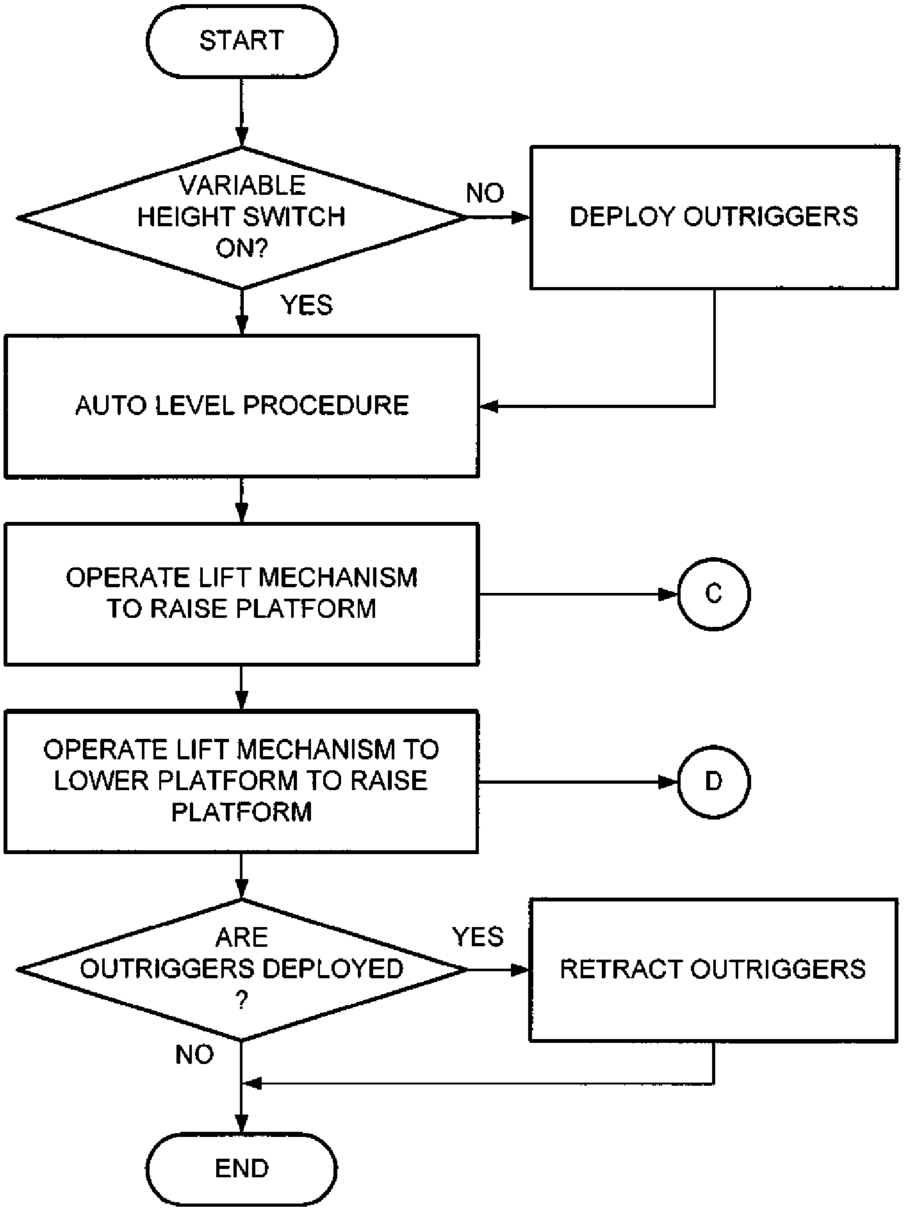
FIG. 6 is a schematic flow diagram of one implementation of the method of the present disclosure.
Figure 7:
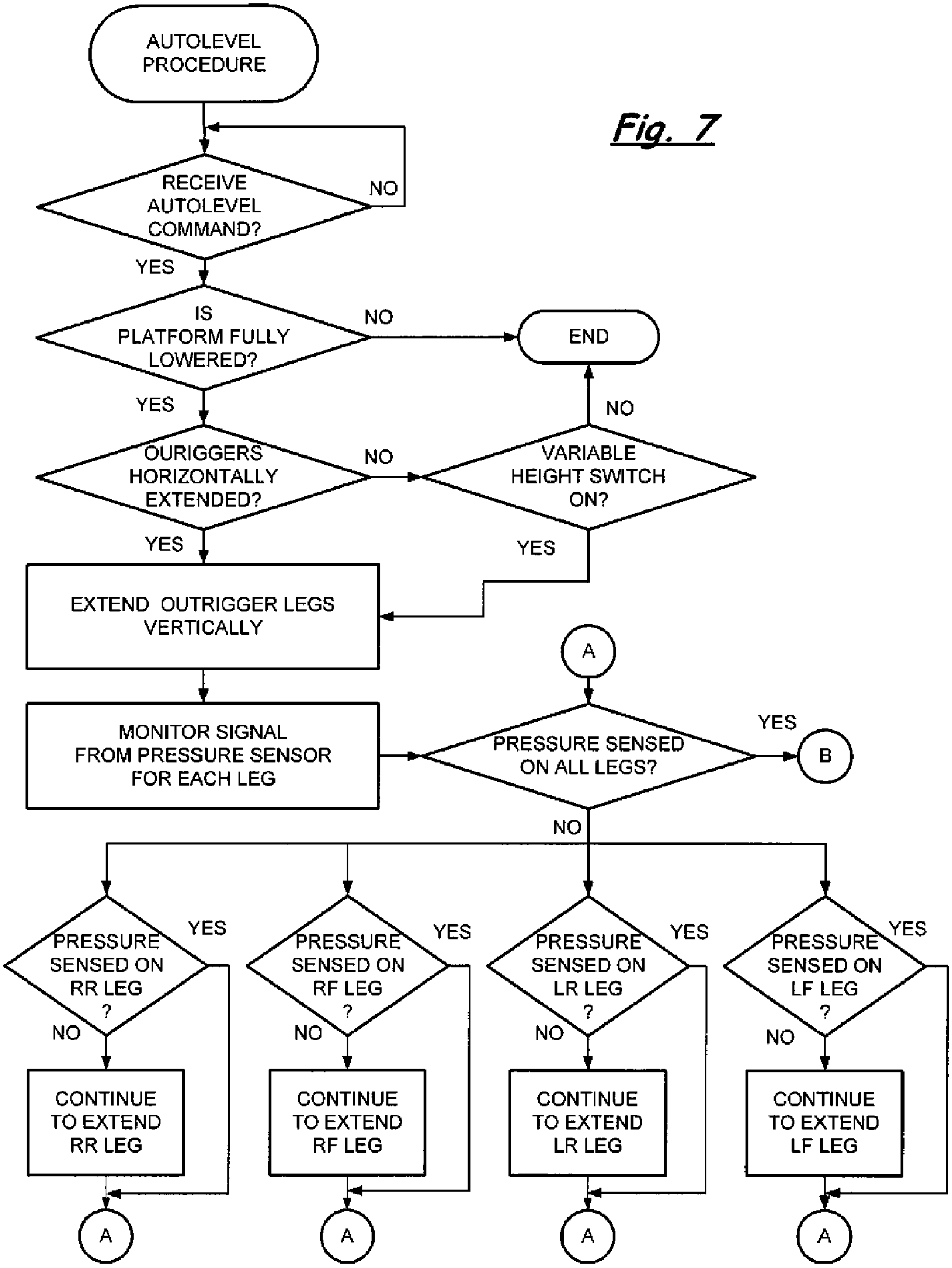
FIG. 7 is a schematic flow diagram of a portion of an implementation of an auto-level process of the present disclosure.

In FIGS. 1 and 2, elements of the aerial work platform apparatus 10 are shown in their generally retracted position which is suitable for transport or travel of the apparatus between sites, such as movement along a road or highway. In FIGS. 3 and 4, the elements of the apparatus 10 are shown in a generally extended position suitable for use such as raising the platform above the ground surface. The aerial work platform apparatus 10 may be used for providing safe, temporary access to elevated areas. The aerial work platform apparatus 10 may include an automatic leveling feature to help reduce the risk of the apparatus overturning when the platform is raised or elevated, as compared to an elevated platform apparatus which has not been put in a sufficiently level orientation. For the purposes of this description, the apparatus 10 will be described in the context of an aerial work platform having a lift mechanism configured to move a platform 30 in a substantially vertical direction with respect to the base frame 12. Illustratively, the lift mechanism depicted in the accompanying figures is a scissor lift mechanism, although the inventive features of this disclosure may be applied to virtually any aerial work platform, regardless of the particular mechanism employed for lifting.

Generally, the apparatus 10 may include a mobile base 11, a platform 30 movable with respect to the mobile base, a lift mechanism 18 for moving the platform 30 with respect to the mobile base, a stabilizing assembly 17 for stabilizing and leveling the mobile base and other components of the apparatus 10 with respect to a surface on which the mobile base is resting, and a control assembly 40 for controlling various aspects of the operation of the lift mechanism and the stabilizing assembly.

The mobile base 11 may comprise a trailer for being pulled along by a prime mover, a vehicle with a motor or engine integrated into the vehicle, or other mobile base capable of supporting the platform and associated components. Illustratively, the apparatus 10 will be described in terms of a mobile base which is a trailer, although it should be recognized that the invention is not limited to the illustrative embodiments. The mobile base 11 may include a base frame 12 which forms the frame of the trailer of the illustrative mobile base 11. In this illustrative and other embodiments, the mobile base 11 may further include a tongue extension 8 that is mounted on the base frame 12, an axle 14 mounted on the base frame 12, and a pair of wheels 16 mounted on the axle 14. The axle 14 may be substantially centered on the base frame 12 such that the weight of the apparatus 10 is primarily borne by the wheels 16 and not primarily imposed upon the tongue extension 8 of the base frame 12 or a jack 9 mounted thereon, although this is not critical. In the illustrative embodiments, the wheels 16 are not driven by a motor or engine, and are free to rotate on the axle at up to highway speeds. The mobile base 11 may include other elements that will not be further discussed here, especially in embodiments where the mobile base is a motorized vehicle.

In greater detail, the base frame 12 may have a substantially rectangular shape with corners. At or adjacent to each corner of the base frame 12 may be an opening of a tubular mounting channel 15 for receiving elements used to level and otherwise manipulate the physical position of the base frame 12.

The stabilizing assembly 17 may include at least one outrigger structure 19 for stabilizing the apparatus 10 during use and preferably, but not critically, includes more than one outrigger structure 19. In the illustrative embodiments, the stabilizing assembly 17 includes four outrigger structures 19, with each outrigger structure being located at or near one of the four corner locations on the base frame 12. Portions of each of the outrigger structures 19 may be moved laterally or horizontally outward from the base frame 12 to increase the relative size of the footprint of the outrigger structures over the ground surface, which permits the outrigger structures to provide a broader, and thus more stable, base for the apparatus 10 (see, e.g., FIGS. 3 and 4). Those portions of the outrigger structures 19 may also be moved laterally or horizontally inward to reduce the relative size of the footprint of the outrigger structures and provide a width that is more compact and thus more suitable for storage and transport when the apparatus is not being used for lifting items with the platform (see, e.g., FIGS. 1 and 2).

Illustratively, each of the outrigger structures 19 may include an outrigger leg 20 for selectively engaging the ground surface below the apparatus 10, and a lateral extension member 28 mounted to the outrigger leg 20 by a bracket 27. The bracket 27 and lateral extension member 28 mount the outrigger leg 20 to the base frame 12 and position the outrigger leg with respect to the mobile base 11. The lateral extension member 28 may be mounted on the base frame 12, and may be movable with respect to the base frame. In some embodiments, the lateral extension member 28 is movable in a substantially horizontal plane when the mobile base is positioned for use, to move the outrigger leg between a travel position in which the outrigger leg is located relatively close to the base frame and a use position in which the outrigger leg is positioned relatively further away from the base frame than when in the travel position. This movement may be provided by movement of the lateral extension member 28 associated with each of the outrigger structures into and out of one of the mounting channels 15 of the base frame. The lateral extension member 28 may be slidable inwardly and outwardly with respect to the respective channel 15 to accordingly extend and retract the respective outrigger structure.

The lateral extension member 28 may be secured in the channel 15 at a number of different degrees of extension, including the travel and use positions. To accomplish this, a securing pin 13 may be mounted on the mounting channel 15 to selectively engage or be disengaged from the lateral extension member. The securing pin 13 may be located at or adjacent to the opening of the mounting channel 15, and may pass through the channel 15 to engage a securing aperture 29 on the lateral extension member. The lateral extension member 28 may include at least two securing apertures, with an aperture being located at each position on the extension member that corresponds to one of the travel and use positions, and apertures may be located at other intermediate or extreme positions.

In the illustrative embodiment, each of the outrigger legs 20 may comprise an elongated fixed portion 24 and an extension portion 26 which moves with respect to the fixed portion.

The movement of the extension portion 26 is generally in a vertical direction to permit the extension portion to contact the ground surface below the apparatus 10. In some embodiments, the fixed portion 24 has a hollow cavity that receives a section of the elongated extension portion 26. The elongated extension portion 26 may move in a longitudinal direction in relation to the fixed portion 24. The fixed portion 24 has a first end and a second end, with the second end of the fixed portion 24 receiving the section of the extension portion 26. The extension portion 26 may also have a first end and a second end, with the first end being received in the fixed portion 24 and the second end of the extension portion 26 having a ground-contacting pad 21 mounted thereon for contacting the ground surface beneath the apparatus 10.

Each outrigger leg 20 may include an actuator 22 configured to move the extension portion 26 with respect to the fixed portion 24 (see FIG. 3). The actuator 22 acts to extend and retract the extension portion with respect to the fixed portion. In some embodiments, the actuator 22 may push and pull the extension portion with respect to the fixed portion. Illustratively, the actuator 22 may be mounted at or adjacent to the first end of the fixed portion 24 and may be connected to or otherwise interfaced with the first end of the extension portion 26. The actuator 22 may include a mechanical actuator, hydraulic actuator, linear motor, or segmented spindle. Depending on the mechanism of operation, the actuators 22 may have a forward direction and a reverse direction, wherein the forward direction causes the actuator 22 to extend the extension portion and the reverse direction of the actuator retracts the extension portion.

Significantly, each outrigger leg 20 may include a sensor for sensing contact between the leg, such as the extension portion 26 or the ground contacting pad 21, and the ground surface. In the illustrative embodiments, each outrigger leg 20 includes a pressure sensor 23 for generating an electrical signal corresponding to the degree of pressure exerted against the ground-contacting pad 21 of the outrigger leg 20, such as pressure exerted by the ground on the pad 21 as pad is moved into contact with the ground surface by extension of the outrigger leg. The pressure sensor 23 may include any sensor or transducer capable of converting a physical pressure into an electrical signal, including potentiometric pressure sensors, inductive pressure sensors, capacitive pressure sensors, piezoelectric pressure sensors, strain gauge pressure sensors, optical pressure sensors, mechanical deflection pressure sensors and microelectromechanical systems (MEMS) pressure sensors.

The lift mechanism 18 of the apparatus 10 is configured to raise and lower the vertical level of the platform 30 above the ground surface by increasing and decreasing the distance between the base frame 12 and the platform. The lift mechanism 18 may comprise any of a number of suitable mechanisms for lifting the movable platform 30 to a vertical height chosen by the operator. Illustratively, the lift mechanism 18 comprises a scissors lift structure that is actuated by a hydraulic piston and cylinder arrangement, but may comprise other structures such as a boom lift, and may use hydraulically-operated or mechanically-operated elements such as rack and pinion elements or screw thread elements.

The movable platform 30 may comprise any platform capable of supporting the weight of one or more operators and the weight of any accessory equipment. Though the movable platform 30 is designed primarily for vertical movement, horizontal movement may take place when the lift mechanism 18 lifting the movable platform 30 is of a type that imparts vertical and horizontal motion. In the illustrative embodiment, the movable platform 30 may comprise a flat surface in a substantially horizontal plane. The movable platform 30 may be of a fixed size or may be of a variable size, in which the area of the movable platform 30 can be increased by sliding or otherwise extending a portion of the movable platform 30 in horizontal direction. The movable platform 30 may have an extended state (shown in FIG. 4) and a retracted state (shown in FIG. 3). Illustratively, a railing 32 may be affixed to the movable platform 30 such that the railing 32 extends about or around operators located on the movable platform 30.

The control assembly 40 of the apparatus 10 may include one or more control panels 42, 44 for controlling both the lifting and leveling operations of the apparatus 10. In the illustrative embodiment, two control panels may be utilized. A first control panel 42 may be mounted on the base frame 12 for use by an operator located on the ground. A second control panel 44 may be mounted on the movable platform 30 for use by an operator located on the movable platform 30. The first and second control panels may each include inputs or controls that are duplicated on the other control panel, and may include controls that are found on only one of the panels. The first control panel 42 may include control inputs corresponding to commands for limiting the maximum height of the movable platform 30, raising the movable platform 30, lowering the movable platform 30, extending or retracting the outrigger legs 20, leveling the outrigger legs 20 of the trailer base frame 12 or disabling the apparatus 10. The control inputs may be made via a plurality of switches, although it is contemplated that virtually any suitable means for command entry may be utilized.

The first control panel 42 may include a monitoring system for notifying the operator of the status of various components of the apparatus 10. In the illustrative embodiment, the monitoring system includes a series of indicators which are enabled or disabled to communicate the status of the various system components to the operator. The indicators may include one or more lights, a display panel, or an audio source. Illustratively, the indicators may report the status or position of one or more outrigger legs 20, the direction of travel of the movable platform 30, the loading (or overloading) of the movable platform 30, the voltage status of a power source for the apparatus; or the existence of a condition requiring operator attention. Additionally, the first control panel 26 may include an input for enabling the second control panel to control the apparatus 10.

The second control panel 44 may include inputs corresponding to commands for raising the movable platform 30, lowering the movable platform 30, or disabling the apparatus 10. The inputs may be made via a plurality of switches, although again other means may be utilized.

The apparatus 10 may further include a power source, both for operating the control assembly and supplying other electrical needs of the apparatus 10. The power source may comprise a battery for powering various components without requiring an electrical connection to an electrical power outlet or to a tow vehicle. The battery may be of the single-use type, but is most suitably of the rechargeable type. In other embodiments, the power source may comprise an electrical cord configured to be plugged into an electrical power outlet or to be connected to the electrical system of a tow vehicle. The power source may further comprise a power converter for converting the power from an electrical power outlet or from the tow vehicle to a voltage and amperage suitable for use with control assembly of the apparatus 10. An electric motor may be provided for pumping hydraulic fluid into or out of a hydraulic cylinder in order to cause the lift mechanism 18 of the apparatus 10 to raise or lower.

A level sensing apparatus, either analog or digital, may be used to supply the control assembly 40 with an input for determining when the base frame 12 of the apparatus 10 is level from front to back and from left to right. The electronic level sensing device may comprise a single level sensing device which detects and signals both the front to back and left to right level status, or two or more level sensing devices configured to each report either the front to back or left to right level status (or level along some other axis). Illustratively, the level sensing apparatus includes a front to back level sensor 45 for sensing the orientation about an axis extending transverse to the normal direction of travel of the mobile base 11, and a side to side level sensor 48 for sensing the orientation about an axis extending longitudinally and parallel to the normal direction of travel of the mobile base.

In FIG. 1, the apparatus 10 is shown in the travel position, with the outrigger legs 20 retracted closely to the base frame 12 and held in such position by the securing pins 13. In FIG. 4, the apparatus 10 is shown in the in-use position, with the outrigger legs 20 horizontally extended from the base frame 12 and held in such position by the securing pins 13. The movable platform 30 is shown vertically lifted by the lift mechanism to a vertically elevated position above the base frame by the lift mechanism 18.

To use the device for lifting people or equipment, the apparatus 10 may first be disconnected from any towing vehicle and supported about the tongue extension 8 by a trailer jack 9 or similar support device. The outrigger legs 20 may then each be extended from their horizontally retracted travel position to a horizontally extended, in-use position. This movement of the legs 20 may be accomplished by manual- or powered-actuation. Significantly, if the terrain surrounding the apparatus 10 prohibits or blocks partial or full extension of the outrigger legs 20 from the retracted travel position, the apparatus 10 may be operated in a mode which reduces the maximum lift height from the full, unrestrained lift height to a limited, intermediate lift height. The full, unrestrained lift height is the maximum operating height of the apparatus 10 under ideal, unrestricted conditions. The full, unrestrained lift height may not be appropriate in situations where the apparatus 10 may be prone to overturning, such as when the apparatus rests on a ground surface that is not level and as a result the apparatus is also not oriented in a substantially level condition, or where the apparatus 10 is not properly braced against the ground surface. In order to more safely raise the movable platform 30 in situations where the apparatus 10 may be prone to overturning, the maximum lift height may be reduced from the full, unrestrained lift height to a limited, intermediate lift height.

In FIG. 4, the outrigger legs 20 are shown in a horizontally extended position, such that the horizontal distance between the outrigger legs 20 and the base frame 12 is greater than the horizontal distance between the outrigger legs 20 and the base frame 12 in the retracted position. If one or more of the outrigger legs 20 cannot be horizontally extended to the in-use position, the control assembly 40 may be configured or programmed to not allow the apparatus 10 to be automatically leveled and/or to not allow the platform 30 to be raised to a full lift height. Because use of the apparatus 10 to lift people or equipment may be required in situations where the surrounding terrain does not permit extension of one or all of the outrigger legs 20, the control assembly 40 may include a variable height command that, when initiated (for example, by an operator), allows automatic leveling of the lift apparatus 10 and/or allows raising and lowering of the movable platform 30, regardless of the horizontal position of the outrigger legs.

The variable height command limits the maximum operating height of the apparatus 10 to an intermediate height that is less than the full, unrestricted lift height, thereby preventing the movable platform 30 from being raised too high without adequate support, a situation that may cause the apparatus 10 to become unstable or overturn. The control assembly 40 will not allow the movable platform 30 to be lifted or raised if one or more of the outrigger legs 20 are retracted and the variable height command is not enabled by the operator. If the variable height command is enabled by the operator, the apparatus 10 is able to be automatically leveled by the stabilizing assembly 17. If the variable height command is enabled by the operator, the apparatus 10 may also be able to raise the movable platform 30, and optionally to raise the platform to an intermediate lift height, regardless of the horizontal position of the outrigger legs 20.

Input from an operator is received by the control assembly 40 to enable and initiate an automatic leveling procedure (see FIGS. 6 through 10). Initiation of the automatic leveling procedure causes the control assembly 40 to receive inputs or signals from, and send outputs or signals to, the stabilizing assembly, which is illustratively represented by one or more outrigger legs 20, to adjust the stabilizing assembly so that the orientation of the base frame is adjusted to be substantially level if it is not level at the initiation of the leveling procedure.

The automatic leveling procedure may be disabled if at least one of the outrigger legs 20 is detected or sensed to be partially or completely horizontally retracted, and is not in the horizontally extended position, unless the variable height command is enabled. This process may be performed by one or more position sensors 50, with one of the position sensors preferably being located on each outrigger leg. During the automatic leveling procedure, the vertical position of the movable platform 30 is determined (see, e.g., FIG. 7). If the vertical position of the movable platform 30 is not in the lowest position, the control assembly may be configured so that the automatic leveling procedure cannot proceed, and the control assembly 40 will disallow control of the apparatus 10. Optionally, the control assembly 40 may be configured to automatically lower the movable platform 30 to the lowest position from the current position so that the automatic leveling procedure may proceed.

If the movable platform 30 is sensed as being in the lowest, retracted position, the control assembly 40 receives inputs from sensors 50 that determine if each of the outrigger legs 20 is horizontally fully extended to the in-use position with respect to the base frame 12. If the control assembly 40 senses that at least one of the outrigger legs 20 is not horizontally fully extended, and the variable height command is not enabled, the automatic leveling procedure is disabled or discontinued. If the control assembly 40 senses that at least one of the outrigger legs 20 is not horizontally fully extended, and the variable height command is enabled, the control assembly determines a maximum liftable height of the movable platform 30 that is reduced from or lower than an unrestricted full lift height to a reduced intermediate lift height. The reduced intermediate lift height may be a height that is based upon a safe lift position of the movable platform without the benefit of the effect of the stabilizing assembly 17. For example, the reduced intermediate lift height may be a height that is suitably stabilized by the wheels of the mobile base 11 alone without the benefit of deployment of the stabilizing assembly. Other methods or factors may be employed to determine the reduced intermediate lift height.

The control assembly 40 may cause extension of each outrigger leg 20 until the ground-contacting pad 21 encounters resistance. The pressure sensor 23 in each outrigger leg 20 returns an electrical signal indicating the pressure or resistance encountered by the outrigger leg 20 as the leg is extended, the pressure presumably resulting from contact between the pad 21 and the ground surface. The control assembly 40 may discontinue extension of each outrigger leg 20 when a signal is detected that there is resistance to further movement (see FIG. 7), such as a signal from the pressure sensor 23 that indicates that the pressure sensor is being subjected to pressure from contact with the ground surface.

When each outrigger leg 20 has encountered resistance indicating contact with the ground surface, and further extension of the leg has been terminated by the control assembly 40, the control assembly may then lengthen or shorten the vertical length of each of the individual outrigger legs 20 until the orientation of the base frame 12 is detected or sensed to be level.

Figure 8:
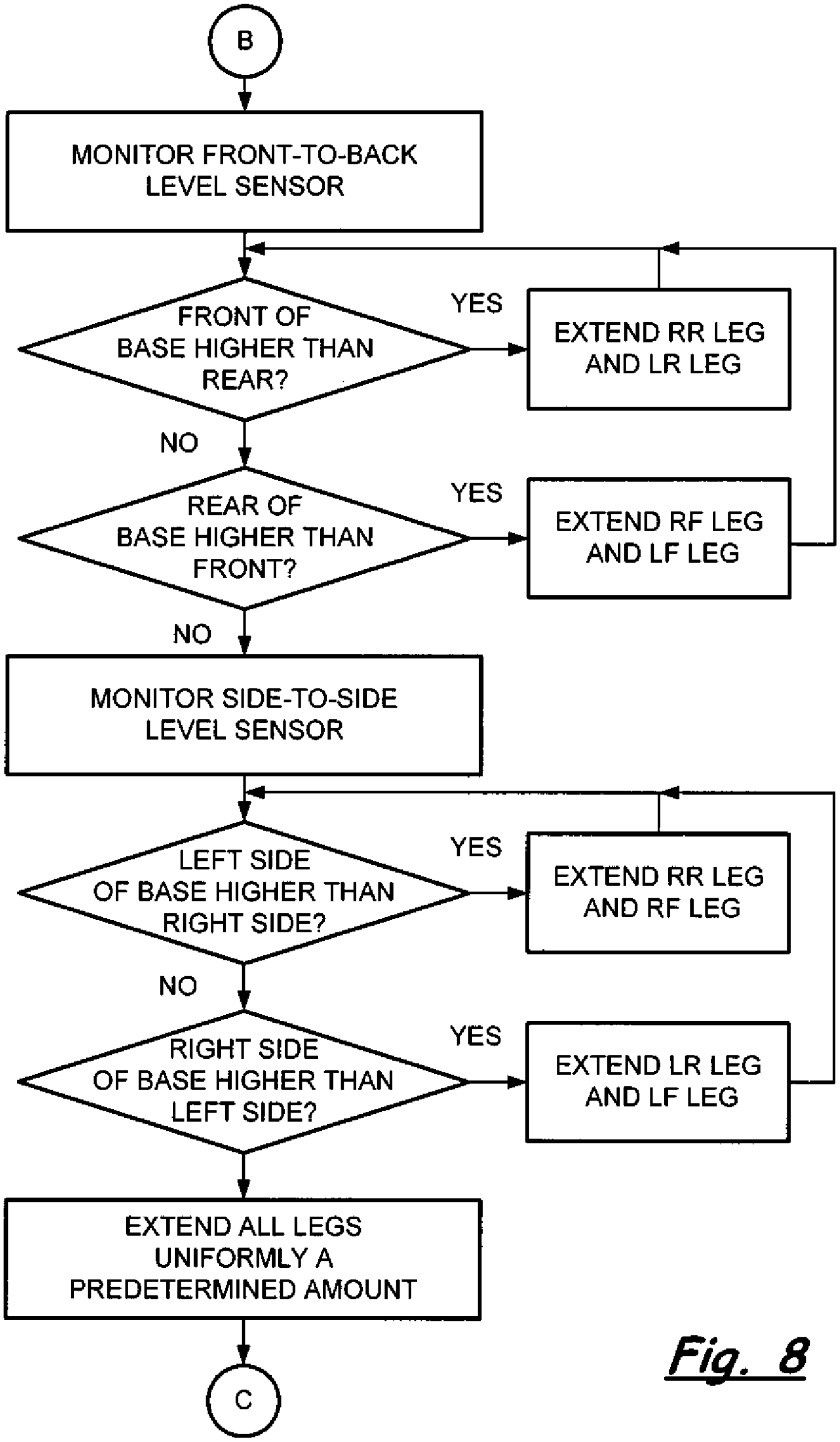
FIG. 8 is a schematic flow diagram of a further portion of an implementation of the auto-level process of the present disclosure.

As schematically depicted in greater detail in the flow diagram of FIG. 8, the control assembly 40 begins the automatic leveling procedure by measuring or sensing the orientation of the apparatus 10. This may be accomplished by sensing the front to back orientation and the side to side orientation of the apparatus 10, such as by receiving an orientation signal from one or more level sensors 46, 48 that are oriented to determine the front to back and side to side orientation of, for example, the base frame 12. The processes for determining and adjusting the front to back orientation and the side to side orientation of the apparatus 10 may be preformed serially, simultaneously, or substantially simultaneously. Illustratively, if the front of the apparatus 10 (e.g., the base frame 12) is determined to be higher than the rear of the apparatus 10, the vertical length of the rear right and rear left outrigger legs 20 may be increased or lengthened until the front to back orientation of the apparatus is sensed to be level, or neutral. The lengthening may be accomplished by extending the extension portion 26 from the fixed portion 24. Conversely, if the rear of the apparatus is determined to be higher than the front of the apparatus, the vertical length of the front right and front left outrigger legs 20 may be increased or lengthened until the front to back orientation of the apparatus is determined to be level or neutral. Optionally, the vertical length of any of the outrigger legs may be shortened or retracted to move the apparatus toward a level orientation rather than lengthening or extending another of the legs.

The control assembly 40 may also measure the left to right orientation of the apparatus 10 (see FIG. 8), and if the orientation in this direction is determined to be other than level, the control assembly may lengthen or extend the rear right and front right outrigger legs 20 if the left side of the apparatus (e.g., base frame 12) is determined to be higher than the right side of the apparatus 10, until the left to right orientation is determined to be level or neutral. Conversely, the control assembly 40 may lengthen or extend the rear left and front left outrigger legs 20 if the right side of the apparatus 10 is detected to be higher than the left side of the apparatus, until the left to right orientation is determined to be level or neutral.

Once the apparatus 10 has been brought into a level or substantially level orientation, all outrigger legs 20 may optionally be lengthened or extended in order to further lift and enhance the stability of the machine (see FIG. 8). This additional lift may be performed to remove the wheels from contact with the ground surface, or to lessen the chance for the wheels to contact the ground surface when the lift mechanism is being operated. To accomplish this additional amount of lift, all of the outriggers legs may be extended a uniform distance from their respective positions after the auto-level procedure has been performed. In the illustrative embodiment, the actuators 22 for each leg are actuated to extend the extension portion 26 of the outrigger leg 20 for a uniform period of time, although other ways of obtaining a uniform extension of all (or at least more than one) of the outriggers legs may be utilized. In some embodiments, is the period of time of actuation may be three seconds. Optionally, all or more than one of the outrigger legs 20 may be lengthened the same finite distance, especially if there is some means provided for measuring or sensing the precise length of extension.

Figure 9:
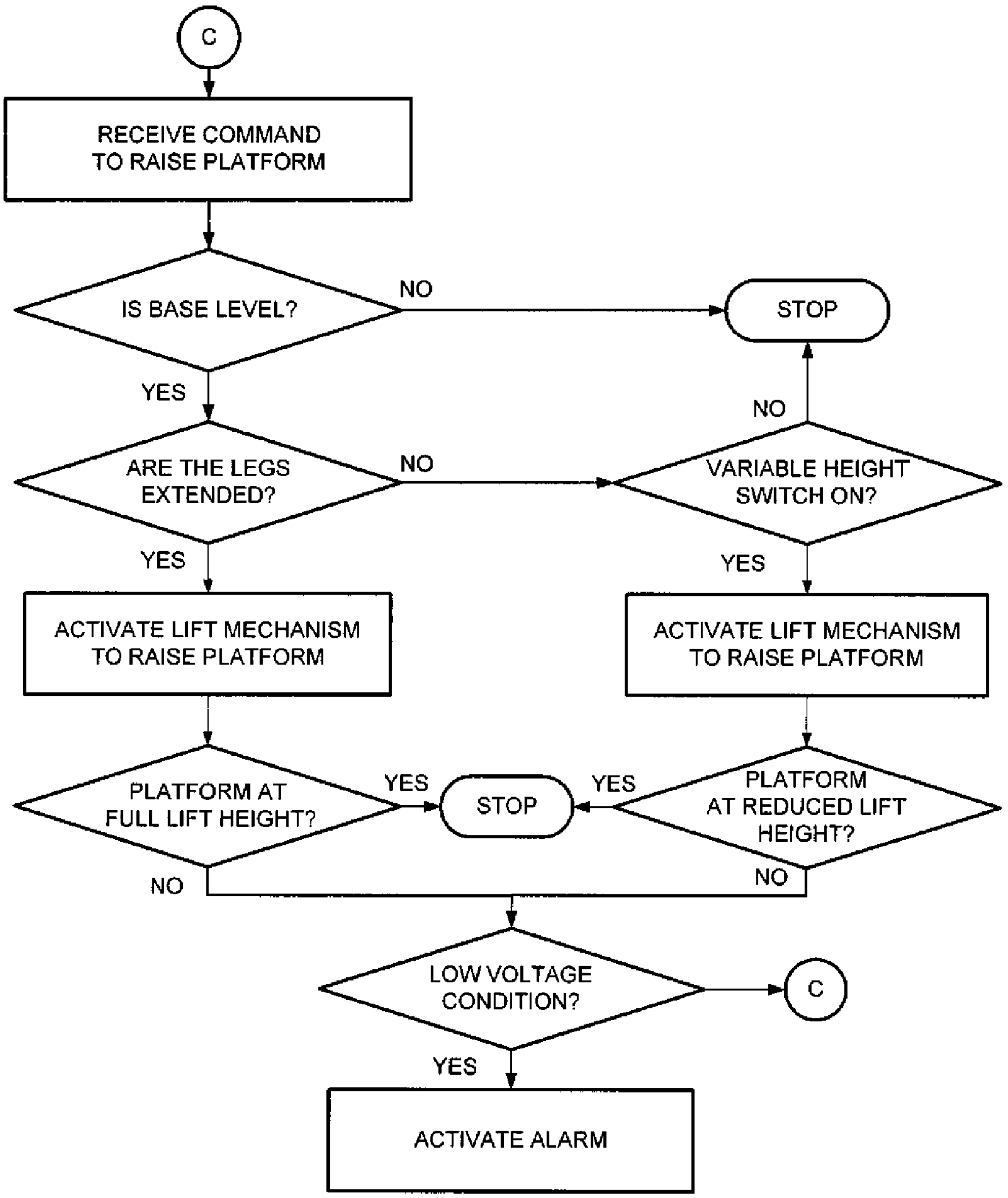
FIG. 9 is a schematic flow diagram of a still further portion of an implementation of the auto-level process of the present disclosure.

Schematically depicted in the flow diagram of FIG. 9 is an illustrative process for raising the platform 30 when a command to raise the platform is received from the operator. Initially, the control assembly may determine if the base frame 12 is in a substantially level condition. If so, the control assembly may determine if the outrigger legs 20 are extended. If the legs are extended, the lift mechanism may be activated to raise the platform to the desired height, which may be indicated by the operator by the length of time that a control is actuated. If the full extension height is reached, then the lift mechanism is deactuated.

If one or more of the legs 20 are not detected to be extended, then the control assembly may determine if the variable height command has been received from the operator, and if so, then the lift mechanism may be activated to raise the platform to the appropriate reduced intermediate lift height. Upon reaching the intermediate lift height, the lift mechanism is deactuated. If a low voltage condition is detected in the power source (battery) of the apparatus 10, then an alarm may be sounded to alert the operator that a low charge may be present in the battery.

Figure 10:
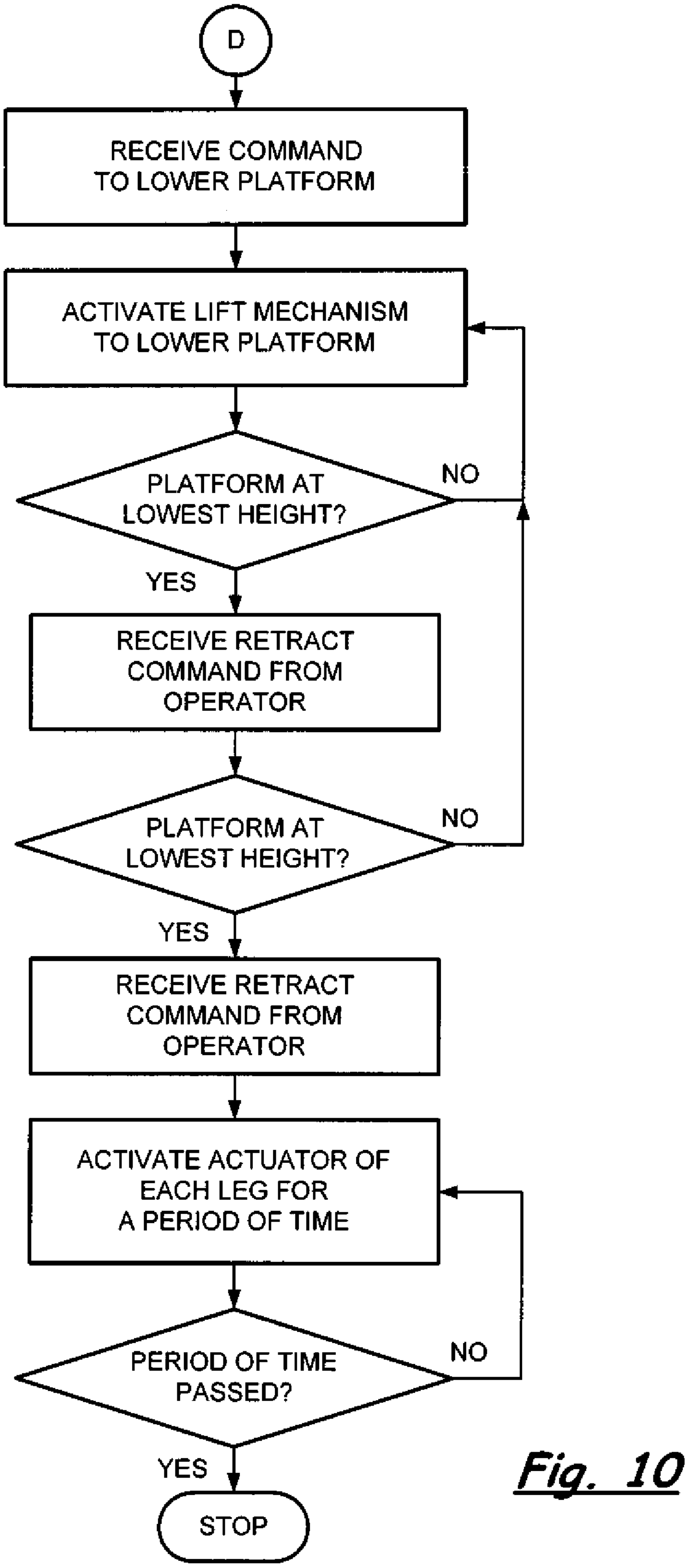
FIG. 10 is a schematic flow diagram of a yet further portion of an implementation of the auto-level process of the present disclosure.

Depicted schematically in the flow diagram of FIG. 10 is an illustrative process to prepare the apparatus 10 for travel. When the control assembly 40 receives input from an operator to begin the process, such as by receiving a commend to retract the outrigger legs 20, the control assembly 40 may determine the vertical position of the movable platform 30 relative to the base frame 12 and may disable or prevent the outrigger retraction procedure if the platform 30 is determined to not be lowered (e.g., is partially or fully raised) such that the vertical height of the movable platform 30 is at its lowest level. If the movable platform 30 is determined by the control assembly 40 to be positioned at its lowest level, the control assembly shortens or retracts each of the four outrigger legs 20 to a fully retracted position. This retraction process may be accomplished by, for example, causing the actuator 22 to retract the extension portion 26 of the respective outrigger leg, and the actuator may be activated for a set amount of time for this purpose. This activation of the actuator 22 may be repeated if any of the outriggers legs are detected to not be fully retracted. Once the control assembly 40 has verified that all outrigger legs 20 are fully retracted, the retracting process is complete.

The present apparatus 10 offers advantages over existing systems which require manual deployment of outriggers or the manual adjustment of outriggers to level the lift. Involving an operator in these tasks introduces potential errors from, for example, failure to ensure the lift is completely level. At the very least, requiring an operator to manually perform the leveling functions introduces the risk that the task will be viewed as overly burdensome and avoided entirely, resulting in equipment damage and human injury. The automated nature of the apparatus 10 avoids this problem.

Furthermore, the present apparatus employs a validation procedure to ensure that proper bracing and leveling has been performed before the platform is raised. Known aerial work platforms merely respond to operator commands to raise the platform lift without verifying or in checking the level of the chassis in any way. Operators of aerial work platforms may not realize the importance of horizontal stabilization and level orientation to the safety of operating an aerial work platform, or may not believe that the time required to manually level and stabilize the chassis produces any positive benefits.

Also, the present apparatus may impose a limit on the lift height if the apparatus is detected not to be properly braced or not to be level in order to reduce the risk of overturning. The maximum allowable lift height of the work platform may be varied depending on the configuration of the apparatus. In situations where an operator has not properly braced the apparatus, such as situations where terrain surrounding the apparatus does not permit full horizontal extension of the outrigger legs, the variable maximum operating height limits the maximum vertical lift of the work platform to a height which reduced the risk of overturning. Furthermore, in situations where an operator has not properly leveled the apparatus, or in situations where the apparatus cannot be properly leveled, raising the work platform may be blocked entirely.

It should be appreciated from the foregoing description that, except when mutually exclusive, the features of the various embodiments described herein may be combined with features of other embodiments as desired while remaining within the intended scope of the disclosure.

It should also be appreciated that in the foregoing description and appended claims, that the term “substantially” when used to modify another term means “for the most part” or “being largely but not wholly or completely that which is specified” by the modified term.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A method for automatically leveling a mobile aerial work platform apparatus comprising the steps of:

providing a mobile aerial work platform apparatus including a mobile base, a movable platform, a lift mechanism configured to move the platform in a substantially vertical direction with respect to the mobile base, a stabilizing assembly including at least one outrigger leg mounted on the mobile base, a plurality of sensors configured to sense an orientation of the mobile base and a condition of the at least one outrigger leg, and a control assembly in communication with the plurality of sensors, receiving by the control assembly a command from an operator to automatically level an orientation of the mobile base of the apparatus, and automatically adjusting the stabilizing assembly so that an orientation of the mobile base is substantially level, wherein the control assembly is configured to receive input from the sensors and sends output to the stabilizing assembly to perform the automatic adjustment;

detecting if the movable platform is in a lowermost position, and preventing the base frame from being automatically leveled if the movable platform is not in the lowermost position.

2. The method of claim 1, wherein the at least one outrigger leg is extendable in a substantially horizontal direction; and further comprising:

determining a degree of horizontal extension of the at least one outrigger leg of the stabilizing assembly; and preventing or terminating the adjustment of the stabilizing assembly if the at least one outrigger leg of the stabilizing assembly is not horizontally extended.

3. The method of claim 1, wherein the at least one outrigger leg is extendable in a substantially vertical direction; and wherein the step of adjusting the stabilizing assembly further comprises initially adjusting a length of the at least one outrigger leg to contact the ground surface.

4. The method of claim 3, wherein the step of adjusting the stabilizing assembly further comprises adjusting the length of the at least one outrigger leg, if necessary, to move the mobile base toward a level orientation.

5. The method of claim 1, wherein the at least one outrigger leg is extendable in a substantially vertical direction; and wherein the step of adjusting the stabilizing assembly further comprises adjusting the vertical length of the at least one outrigger leg.

6. The method of claim 1, wherein the at least one outrigger leg is extendable and retractable in a substantially vertical direction; and wherein the step of adjusting the stabilizing assembly further includes extending or retracting a vertical length of the at least one outrigger leg until the orientation of the base frame is level.

7. The method of claim 1, wherein the at least one outrigger leg is extendable in a substantially vertical direction; and wherein the step of adjusting the stabilizing assembly further comprises:

lengthening the at least one outrigger leg, sensing any resistance to lengthening of the at least one outrigger leg; and terminating the lengthening of the at least one outrigger leg when resistance is sensed.

8. The method of claim 1, wherein the at least one outrigger leg is extendable in a substantially vertical direction; and wherein the step of providing a mobile aerial work platform apparatus includes providing a pressure sensor on a ground-contacting pad of the at least one outrigger leg to sense contact between the at least one outrigger leg and the ground surface; and wherein the step of adjusting the stabilizing assembly further comprises extending the at least one outrigger leg until the pressure sensor senses contact between the at least one outrigger leg and the ground surface.

9. A method for automatically leveling a mobile aerial work platform apparatus comprising the steps of:

providing a mobile aerial work platform apparatus including a mobile base, a movable platform, a lift mechanism configured to move the platform in a substantially vertical direction with respect to the mobile base, a stabilizing assembly including at least one outrigger leg mounted on the mobile base, a plurality of sensors configured to sense an orientation of the mobile base and a condition of the at least one outrigger leg, and a control assembly in communication with the plurality of sensors, receiving by the control assembly a command from an operator to automatically level an orientation of the mobile base of the apparatus, and automatically adjusting the stabilizing assembly so that an orientation of the mobile base is substantially level, wherein the control assembly is configured to receive input from the sensors and sends output to the stabilizing assembly to perform the automatic adjustment;

wherein the movable platform has an extended position at a full extension vertical height and a retracted position at a vertical height adjacent to the mobile base, and further comprising:

limiting a liftable height of the platform to a reduced intermediate lift height above the mobile base based upon a condition of the stabilizing assembly, the reduced intermediate lift height being vertically higher than the retracted position of the platform and being vertically lower than the extended position of the platform.

10. The method of claim 9, wherein the at least one outrigger leg is extendable and retractable in a substantially horizontal direction; and wherein the step of limiting the liftable height of the platform further comprises:

detecting whether a variable height command is received from the operator, sensing whether the at least one outrigger leg is not horizontally fully extended from the base frame, if the at least one outrigger leg is not horizontally extended about the base frame and the variable height command from the operator is detected, limiting the liftable height of the movable platform to an intermediate height, the intermediate lift height being less than a full lift height of the platform.

11. The method of claim 9, wherein the at least one outrigger leg is extendable and retractable in a substantially horizontal direction; and wherein the step of limiting the liftable height of the platform further comprises:

detecting whether a variable height command is received from the operator, sensing whether the at least one outrigger leg is not horizontally fully extended from the base frame, and if the at least one outrigger leg is not horizontally extended from the base frame and the variable height command from the operator is not detected, preventing the control assembly from automatically leveling the mobile base.

12. The method of claim 9, further comprising the steps of:

detecting if the movable platform is in a lowermost position, and preventing the base frame from being automatically leveled if the movable platform is not in the lowermost position.

13. A method for automatically leveling a mobile aerial work platform apparatus comprising the steps of:

providing a mobile aerial work platform apparatus including a mobile base, a movable platform, a lift mechanism configured to move the platform in a substantially vertical direction with respect to the mobile base, a stabilizing assembly including at least one outrigger leg mounted on the mobile base and being extendable in a substantially vertical direction, a plurality of sensors configured to sense an orientation of the mobile base and a condition of the at least one outrigger leg, and a control assembly in communication with the plurality of sensors, receiving by the control assembly a command from an operator to automatically level an orientation of the mobile base of the apparatus, and automatically adjusting the stabilizing assembly so that an orientation of the mobile base is substantially level, wherein the control assembly is configured to receive input from the sensors and sends output to the stabilizing assembly to perform the automatic adjustment;

extending the at least one outrigger leg a predetermined amount after the mobile base has been brought into a level orientation by the step of automatically adjusting the stabilizing assembly.

14. A method for automatically leveling a mobile aerial work platform apparatus comprising the steps of:

providing a mobile aerial work platform apparatus including a mobile base, a movable platform, a lift mechanism configured to move the platform in a substantially vertical direction with respect to the mobile base, a stabilizing assembly including at least one outrigger leg mounted on the mobile base, a plurality of sensors configured to sense an orientation of the mobile base and a condition of the at least one outrigger leg, and a control assembly in communication with the plurality of sensors, receiving by the control assembly a command from an operator to automatically level an orientation of the mobile base of the apparatus, and automatically adjusting the stabilizing assembly so that an orientation of the mobile base is substantially level, wherein the control assembly is configured to receive input from the sensors and sends output to the stabilizing assembly to perform the automatic adjustment;

limiting a liftable height of the platform above the mobile base based upon a condition of the stabilizing assembly; and wherein the step of limiting the liftable height further comprises the steps of:

detecting whether a variable height command is received from the operator; and if the variable height command is received, limiting the lift mechanism from lifting the platform higher than an intermediate lift height, the intermediate lift height being less than a full lift height of the platform.

15. The method of claim 14 wherein the step of limiting the liftable height further comprises, if the variable height command is not received, allowing the lift mechanism to lift the platform to a full lift height of the platform.

16. A method for automatically leveling a mobile aerial work platform apparatus comprising the steps of:

providing a mobile aerial work platform apparatus including a mobile base, a movable platform, a lift mechanism configured to move the platform in a substantially vertical direction with respect to the mobile base, a stabilizing assembly including at least one outrigger leg mounted on the mobile base, the at least one outrigger leg is extendable and retractable in a substantially horizontal direction, a plurality of sensors configured to sense an orientation of the mobile base and a condition of the at least one outrigger leg, and a control assembly in communication with the plurality of sensors, receiving by the control assembly a command from an operator to automatically level an orientation of the mobile base of the apparatus, and automatically adjusting the stabilizing assembly so that an orientation of the mobile base is substantially level, wherein the control assembly is configured to receive input from the sensors and sends output to the stabilizing assembly to perform the automatic adjustment;

terminating the adjustment of the stabilizing assembly based upon a condition of the stabilizing assembly; and wherein the step of terminating the adjustment of the stabilizing assembly further comprises:

detecting whether a variable height command is received from the operator;

sensing whether the at least one outrigger is in a horizontally retracted position; and if the variable height command is received and the at least one outrigger leg is in a horizontally retracted position, enabling the control assembly to perform the automatic leveling of the orientation of the mobile base.

17. The method of claim 16, wherein the step of terminating the adjustment of the stabilizing assembly further comprises:

detecting whether a variable height command is received from the operator, sensing whether the at least one outrigger is in a horizontally retracted position; and if the variable height command is not received and the at least one outrigger leg is in a horizontally retracted position, disabling the control assembly from attempting to automatically level the orientation of the mobile base.

* * * * *